US009785898B2

(12) United States Patent
Hofman et al.

(10) Patent No.: US 9,785,898 B2
(45) Date of Patent: Oct. 10, 2017

(54) SYSTEM AND METHOD FOR IDENTIFYING RETAIL PRODUCTS AND DETERMINING RETAIL PRODUCT ARRANGEMENTS

(75) Inventors: Yoram Hofman, Kfar Bialik (IL); Meta Rotenberg, Tel Aviv (IL)

(73) Assignee: Hi-Tech Solutions Ltd., Yokneam (IL)

( * ) Notice: Subject to any disclaimer, the term of this patent is extended or adjusted under 35 U.S.C. 154(b) by 140 days.

(21) Appl. No.: 13/528,189

(22) Filed: Jun. 20, 2012

(65) Prior Publication Data
US 2012/0323620 A1 Dec. 20, 2012

Related U.S. Application Data

(60) Provisional application No. 61/499,017, filed on Jun. 20, 2011.

(51) Int. Cl.
*G06Q 10/06* (2012.01)
*G06Q 10/08* (2012.01)
*G06K 9/62* (2006.01)

(52) U.S. Cl.
CPC ......... *G06Q 10/06315* (2013.01); *G06K 9/62* (2013.01); *G06Q 10/06* (2013.01); *G06Q 10/0639* (2013.01); *G06Q 10/087* (2013.01)

(58) Field of Classification Search
CPC ........... G06Q 10/087; G06Q 10/06315; G06Q 10/0639; G06K 9/62
USPC .................... 705/7.25, 7.38, 28; 382/181
See application file for complete search history.

(56) References Cited

U.S. PATENT DOCUMENTS

| | | | |
|---|---|---|---|
| 2008/0036863 A1* | 2/2008 | Esbensen | 348/159 |
| 2008/0306787 A1* | 12/2008 | Hamilton et al. | 705/7 |
| 2009/0059270 A1* | 3/2009 | Opalach et al. | 358/1.15 |
| 2010/0048242 A1* | 2/2010 | Rhoads et al. | 455/556.1 |
| 2010/0070333 A1* | 3/2010 | Musa | 705/10 |
| 2012/0004769 A1* | 1/2012 | Hallenbeck et al. | 700/232 |
| 2012/0127314 A1* | 5/2012 | Clements | 348/150 |

OTHER PUBLICATIONS

Lowe, Distinctive image features from scale-invariant keypoints, International Journal of Computer Vision, 60, 2 (2004), p. 91-110.*

* cited by examiner

*Primary Examiner* — Beth V Boswell
*Assistant Examiner* — Charles Guiliano
(74) *Attorney, Agent, or Firm* — Schwegman Lundberg & Woessner, P.A.; Ariel Reinitz

(57) ABSTRACT

Systems and methods for determining product arrangement are provided. The method includes: receiving one or more images, the one or more images reflecting a retail arrangement of at least one product, processing, with a processor executing code, the one or more images to: (a) identify the at least one product, and (b) determine the retail arrangement of the at least one product, computing, based on (a) an identification of the at least one product and (b) a determination of a retail arrangement of the at least one product, one or more performance indicators, the one or more performance indicators reflecting compliance with one or more retail arrangement guidelines established with respect to the at least one product, and providing feedback based on the one or more performance indicators. Other embodiments of the various aspects include corresponding systems, apparatus, and computer program products.

28 Claims, 5 Drawing Sheets

SYSTEM AND METHOD FOR IDENTIFYING RETAIL PRODUCTS AND DETERMINING RETAIL PRODUCT ARRANGEMENTS

CROSS-REFERENCE TO RELATED APPLICATIONS

The present application claims priority to and the benefit of U.S. Patent Application No. 61/499,017, filed Jun. 20, 2011 which is hereby incorporated by reference in its entirety

TECHNICAL FIELD OF THE INVENTION

This patent application relates generally to the field of product arrangement determination.

BACKGROUND OF THE INVENTION

It has been observed that the arrangement and placement of products in a retail setting can have a significant impact on the sales of such products. Accordingly, a common practice in many retail industries entails manufacturers/distributors and retailers agreeing to terms whereby certain products will be arranged/presented in a retail context (such as on a shelf or shelves) in a specified manner. For example, a product manufacturer may want certain products arranged together (e.g., variants of a specific product line), or on a certain shelf (e.g., at eye-level, at the end of an aisle, etc.), and/or in proximity to/distance from other products (e.g., a specified distance from a competing product).

While such agreements are common, compliance tracking/enforcement of such terms has traditionally been costly/difficult. Product manufacturers/distributors can send individuals to retail locations to track product placement, however such initiatives are generally costly and can outweigh any potential benefit if conducted regularly. Additionally, self-reporting initiatives present an inherent conflict of interest on the part of the retailer, and are thus also ineffective.

It is with respect to these and other considerations that the disclosure made herein is presented.

SUMMARY OF THE INVENTION

Technologies are presented herein in support of a system and method for determining product arrangements. According to one aspect, a method for determining product arrangement is provided. The method includes: receiving one or more images, the one or more images reflecting a retail arrangement of at least one product, processing, with a processor executing code, the one or more images to: (a) identify the at least one product, and (b) determine the retail arrangement of the at least one product, computing, based on (a) an identification of the at least one product and (b) a determination of a retail arrangement of the at least one product, one or more performance indicators, the one or more performance indicators reflecting compliance with one or more retail arrangement guidelines established with respect to the at least one product, and providing feedback based on the one or more performance indicators.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
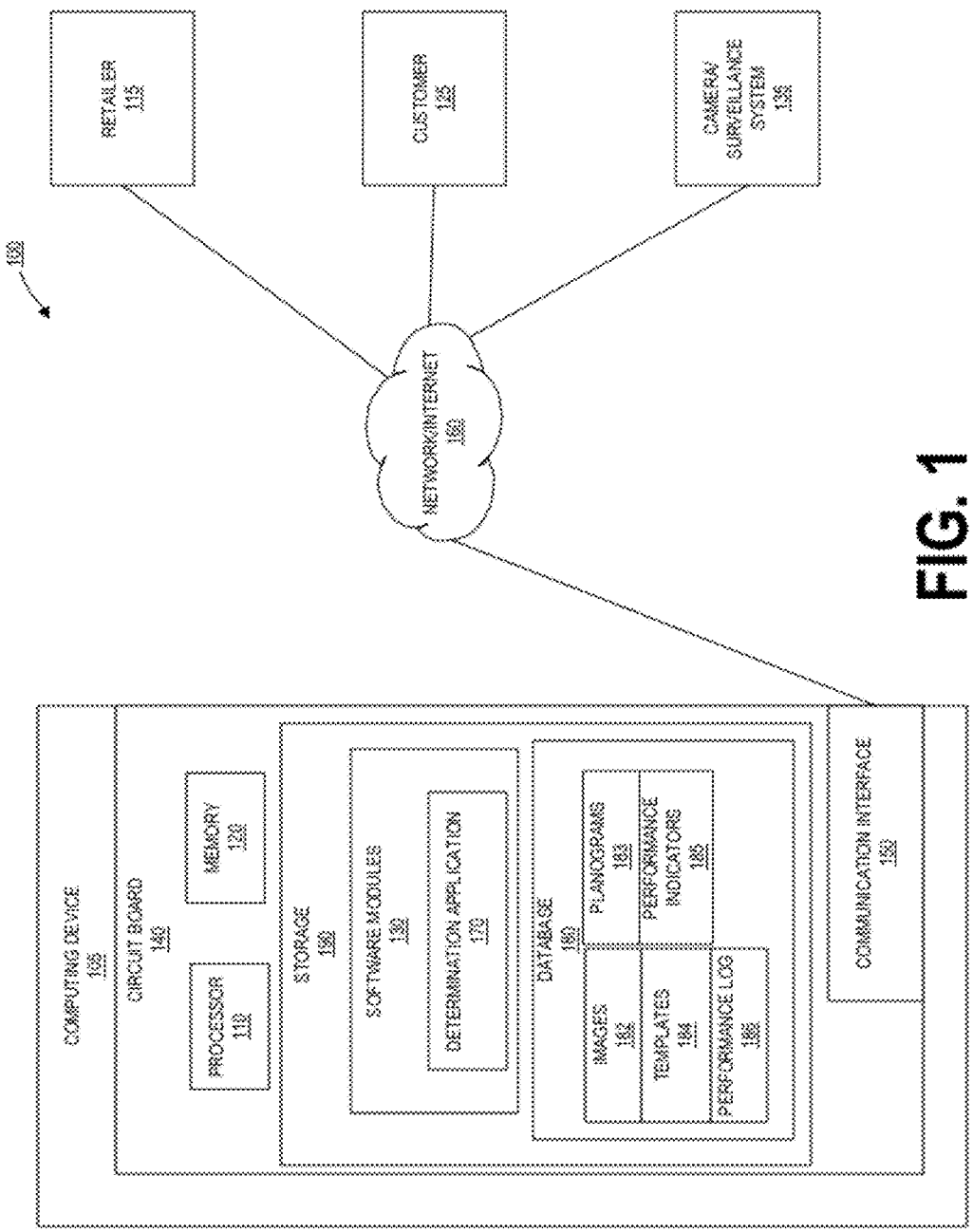
FIG. 1 is a high-level diagram illustrating an exemplary configuration of a product arrangement determination system.

By way of overview and introduction, various systems and methods are described herein that facilitate and enable identification of products and determination of their arrangement within a retail context. It can be appreciated that while product manufacturers/distributors often dictate specific terms and conditions under which their products are to be displayed in a retail setting, monitoring compliance with such terms can be costly and inefficient.

In an effort to enable both retailers and product manufacturers/distributors to more accurately and more efficiently monitor compliance with such retail arrangement guidelines, the systems and methods described herein enable a series of operations whereby one or more images (and/or an ongoing series or stream of images, such as a live video feed) can be processed/analyzed in order to identify the specific products within a given retail space (such as a shelf), as well as to determine the manner in which the products are arranged (e.g., their distribution across one or more shelves).

On the basis of the identification of the various products on a shelf and the determination of their arrangement, various performance indicators can be computed which reflect a measure of compliance with guidelines that dictate the manner in which such products are to be presented in a retail context.

The following detailed description is directed to systems and methods for determining product arrangements. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1 which is a high-level diagram illustrating an exemplary configuration of a product arrangement determination system 100. In one implementation, computing device 105 can be a personal computer or server. In other implementations, computing device 105 can be a tablet computer, a laptop computer, or a mobile device/smartphone, though it should be understood that computing device 105 of product arrangement determination system 100 can be practically any computing device and/or data processing apparatus capable of embodying the systems and/or methods described herein.

Computing device 105 of product arrangement determination system 100 includes a circuit board 140, such as a motherboard, which is operatively connected to various hardware and software components that serve to enable operation of the product arrangement determination system 100. The circuit board 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within product arrangement determination system 100. For instance, program code stored in a computer readable storage device in a server can be downloaded over a network from the server to product arrangement determination system 100.

Preferably, included among the software modules 130 is a product arrangement determination application 170 that is executed by processor 110. During execution of the software modules 130, and specifically the product arrangement determination application 170, the processor 110 configures the circuit board 140 to perform various operations relating to product arrangement determination with computing device 105, as will be described in greater detail below. It should be understood that while software modules 130 and/or product arrangement determination application 170 can be embodied in any number of computer executable formats, in certain implementations software modules 130 and/or product arrangement determination application 170 comprise one or more applications that are configured to be executed at computing device 105 in conjunction with one or more applications or 'apps' executing at remote devices, such as computing device(s) 115, 125, and/or 135 and/or one or more viewers such as internet browsers and/or proprietary applications. Furthermore, in certain implementations, software modules 130 and/or product arrangement determination application 170 can be configured to execute at the request or selection of a user of one of computing devices 115, 125, and/or 135 (or any other such user having the ability to execute a program in relation to computing device 105, such as a network administrator), while in other implementations computing device 105 can be configured to automatically execute software modules 130 and/or product arrangement determination application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Also preferably stored on storage 190 is database 180. As will be described in greater detail below, database 180 contains and/or maintains various data items and elements that are utilized throughout the various operations of product arrangement determination system 100, including but not limited to images 182, planograms 183, templates 184, performance indicators 185, and performance log 186, as will be described in greater detail herein. It should be noted that although database 180 is depicted as being configured locally to computing device 105, in certain implementations database 180 and/or various of the data elements stored therein can be located remotely (such as on a remote device or server—not shown) and connected to computing device 105 through network 160, in a manner known to those of ordinary skill in the art.

As referenced above, it should be noted that in certain implementations, such as the one depicted in FIG. 1, various of the computing devices 115, 125, 135 can be in periodic or ongoing communication with computing device 105 thorough a computer network such as the Internet 160. Though not shown, it should be understood that in certain other implementations, computing devices 115, 125, and/or 135 can be in periodic or ongoing direct communication with computing device 105, such as through communications interface 150.

Communication interface 150 is also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g. using the 802.11 standard) though it should be understood that communication interface 150 can be practically any interface that enables communication to/from the circuit board 140.

At various points during the operation of product arrangement determination system 100, computing device 105 can communicate with one or more computing devices, such as those controlled and/or maintained by one or more individuals and/or entities, such as retailer 115, customer 125, and/or camera/surveillance system 135, each of which will be described in greater detail herein. Such computing devices transmit and/or receive data to/from computing device 105, thereby preferably initiating maintaining, and/or enhancing the operation of the product arrangement determination system 100, as will be described in greater detail below. It should be understood that the computing devices 115 can be in direct communication with computing device 105, indirect communication with computing device 105, and/or can be communicatively coordinated with computing device 105, as will be described in greater detail below. While such computing devices can be practically any device capable of communication with computing device 105, in the preferred embodiment certain computing devices (e.g., that of retailer 115) are preferably servers, while other computing devices (e.g., that of customer 125) are preferably user devices (e.g., personal computers, handheld/portable computers, smartphones, etc.), though it should be understood that practically any computing device that is capable of transmitting and/or receiving data to/from computing device 105 could be similarly substituted.

It should be noted that while FIG. 1 depicts product arrangement determination system 100 with respect to computing devices 115, 125, and 135, it should be understood that any number of computing devices can interact with the product arrangement determination system 100 in the manner described herein. It should be further understood that a substantial number of the operations described herein are initiated by and/or performed in relation to such computing devices. For example, as referenced above, such computing devices can execute applications and/or viewers which request and/or receive data from computing device 105, substantially in the manner described in detail herein.

In the description that follows, certain embodiments and/or arrangements are described with reference to acts and symbolic representations of operations that are performed by one or more devices, such as the product arrangement determination system 100 of FIG. 1. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the product arrangement determination system 100. Other components shown in FIG. 1 can be varied from the illustrative examples shown. The different embodiments can be implemented using any hardware device or system capable of running program code. In another illustrative example, product arrangement determination system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to computing device 105, computing devices 115, 125, and 135 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the product arrangement determination system 100 and the various elements and components described above will be further appreciated with reference to the method for determining a product arrangement as described below, in conjunction with FIGS. 2-5.

Figure 2:
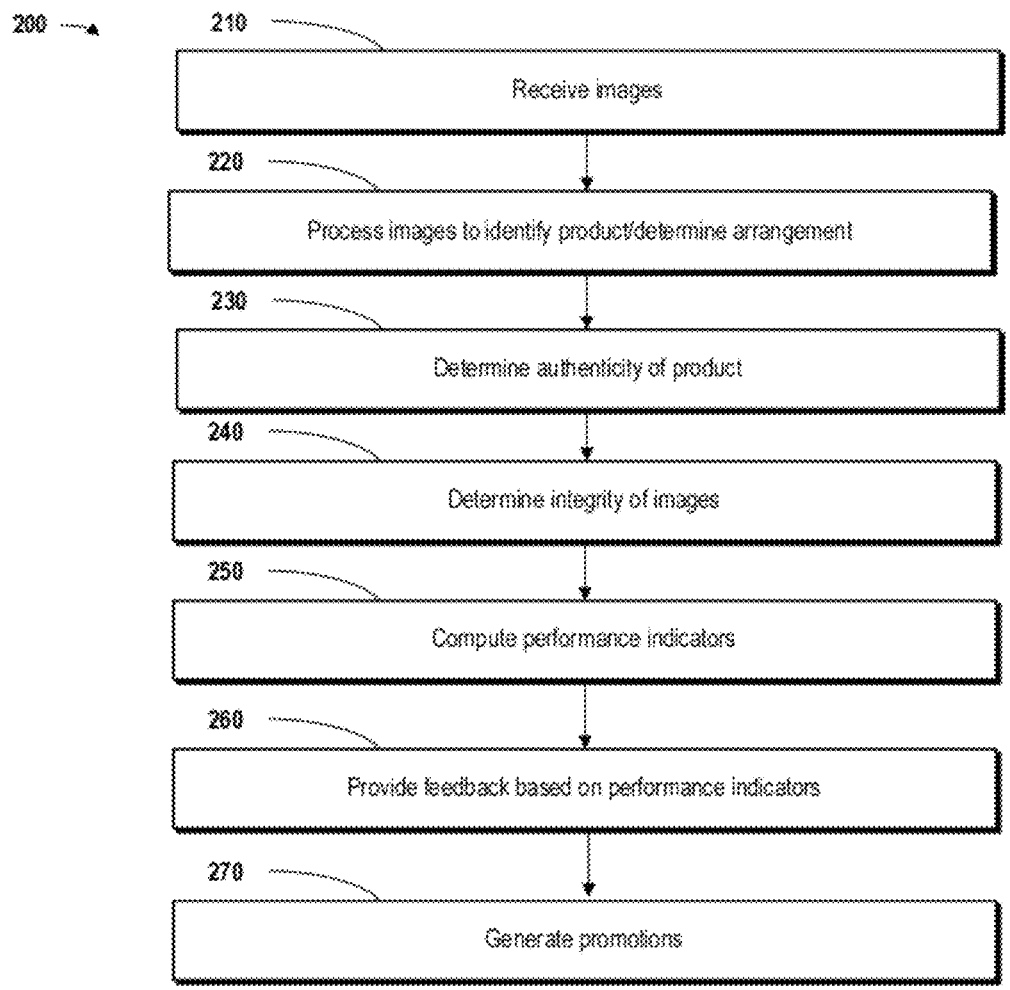
FIG. 2 is a flow diagram showing a routine that illustrates a broad aspect of a method for determining a product arrangement in accordance with at least one embodiment disclosed herein.

Turning now to FIG. 2, a flow diagram is described showing a routine 200 that illustrates a broad aspect of a method for determining a product arrangement in accordance with at least one embodiment disclosed herein. It should be appreciated that several of the logical operations described herein are implemented (1) as a sequence of computer implemented acts or program modules running on product arrangement determination system 100 and/or (2) as interconnected machine logic circuits or circuit modules within the product arrangement determination system 100. The implementation is a matter of choice dependent on the requirements of the device (e.g., size, energy, consumption, performance, etc.). Accordingly, the logical operations described herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 3:
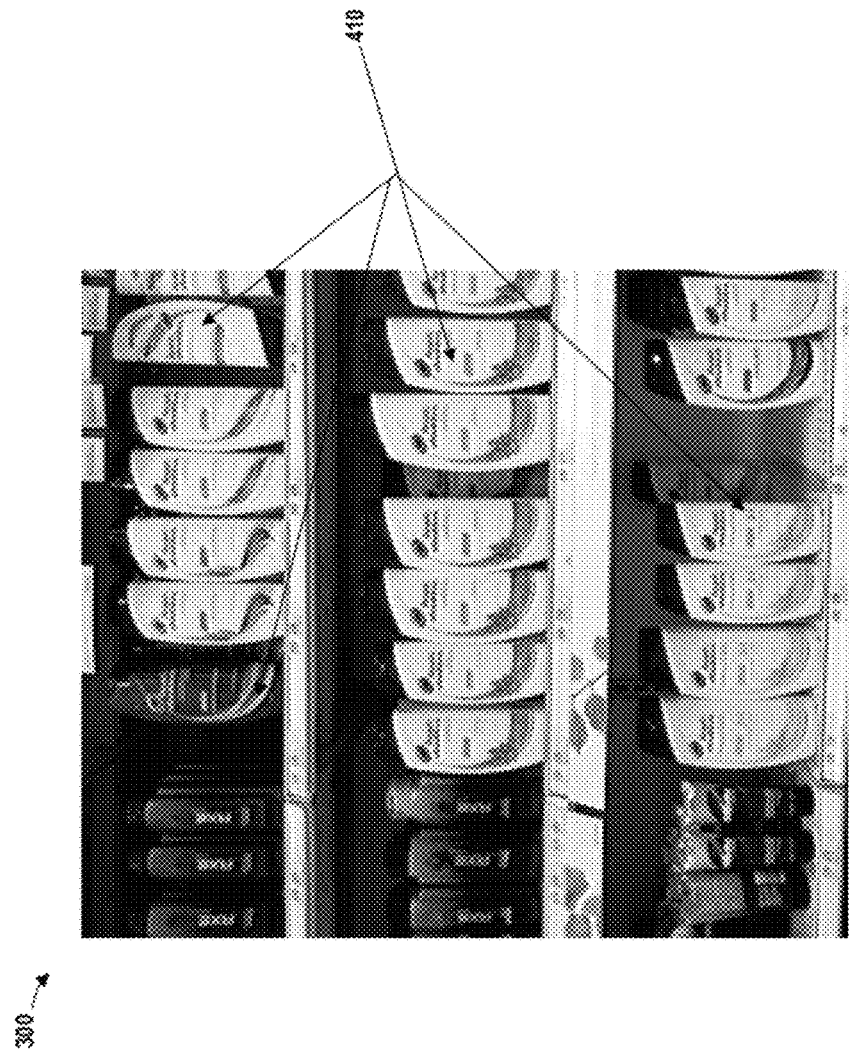
FIG. 3 depicts an exemplary image, showing various products arranged on a shelf in a retail setting in accordance with at least one embodiment disclosed herein.

At 210, processor 110 executing one or more of software modules 130, including, in certain implementations, determination application 170, configures computing device 105 to receive one or more images 182, such as digital images (e.g., JPEG files) and/or video (e.g., MPEG files), as are known to those of ordinary skill in the art. In certain implementations, the image or images reflect a retail arrangement of one or more products (e.g., the arrangement of retail products on a shelf or display in a retail setting such as a store, as described herein). By way of illustration, FIG. 3 depicts an exemplary image 300, showing various products 410 arranged on a shelf in a retail setting.

It should be understood that, in certain implementations, the referenced images/video can be received from one or more sources. For example, a merchant (e.g., a proprietor of a retail location) can capture and/or submit such images, such as by uploading them to a designated website or server. In other implementations, such images can originate from customers or any other individuals (e.g., inspectors) who are able to capture or otherwise obtain such images. In yet other implementations, such images can originate from existing or installed cameras or camera systems, such as security/surveillance systems. Moreover, it should be understood that in certain implementations, images can be received from any number of these (and other) sources. Additionally, it should be noted that while various operations are described herein with respect to a single image, this convention is merely for the sake of simplicity and clarity, however it should be understood that any of the referenced operations can be similarly implemented with respect to multiple images, as is known to those of ordinary skill in the art.

Then, at 220, processor 110 executing one or more of software modules 130, including, in certain implementations, determination application 170, configures computing device 105 to process the images. In doing so, one or more products depicted in the images can be identified. Additionally and/or alternatively, one or more retail arrangements of the products can be determined. For example, various images can be processed using optical recognition (e.g. OCR) to identify the products present therein, such as by processing characters or symbols present on the product (e.g., on a product label). By way of further example, the one or more images can be processed with one or more product templates 184 to identify the one or more products. That is, one or more product templates can reflect one or more visual features (or groups of visual features) based upon which a product can be identified. For example, the presence of one or more visual features (e.g., a particular color, size, shape, etc.) can be factored in to identify a particular product (or to narrow the scope of possible products).

It should be understood that, as referenced and described herein, a "retail arrangement" of one or more products refers to a manner or pattern in which such products are presented in a retail setting or context, such as on a store shelf. For example, a retail arrangement can reflect aspects such as the number of times a particular product (or products) appear on a shelf or display, the relative areas within a shelf or display that such products appear, and/or the placement/location of each respective product relative to other products in the image.

It should also be understood that, in certain implementations, the identification of the a product or products can include an identification of a brand name of a product (e.g., Apple, Sony, Dell, etc.), a product name of a product (e.g., iPod, iPhone, etc.), one or more stock keeping units (SKUs) of a product (e.g., a code or identifier corresponding to a particular product), and/or one or more supplemental materials (e.g., promotional materials such as advertising displays).

Figure 4:
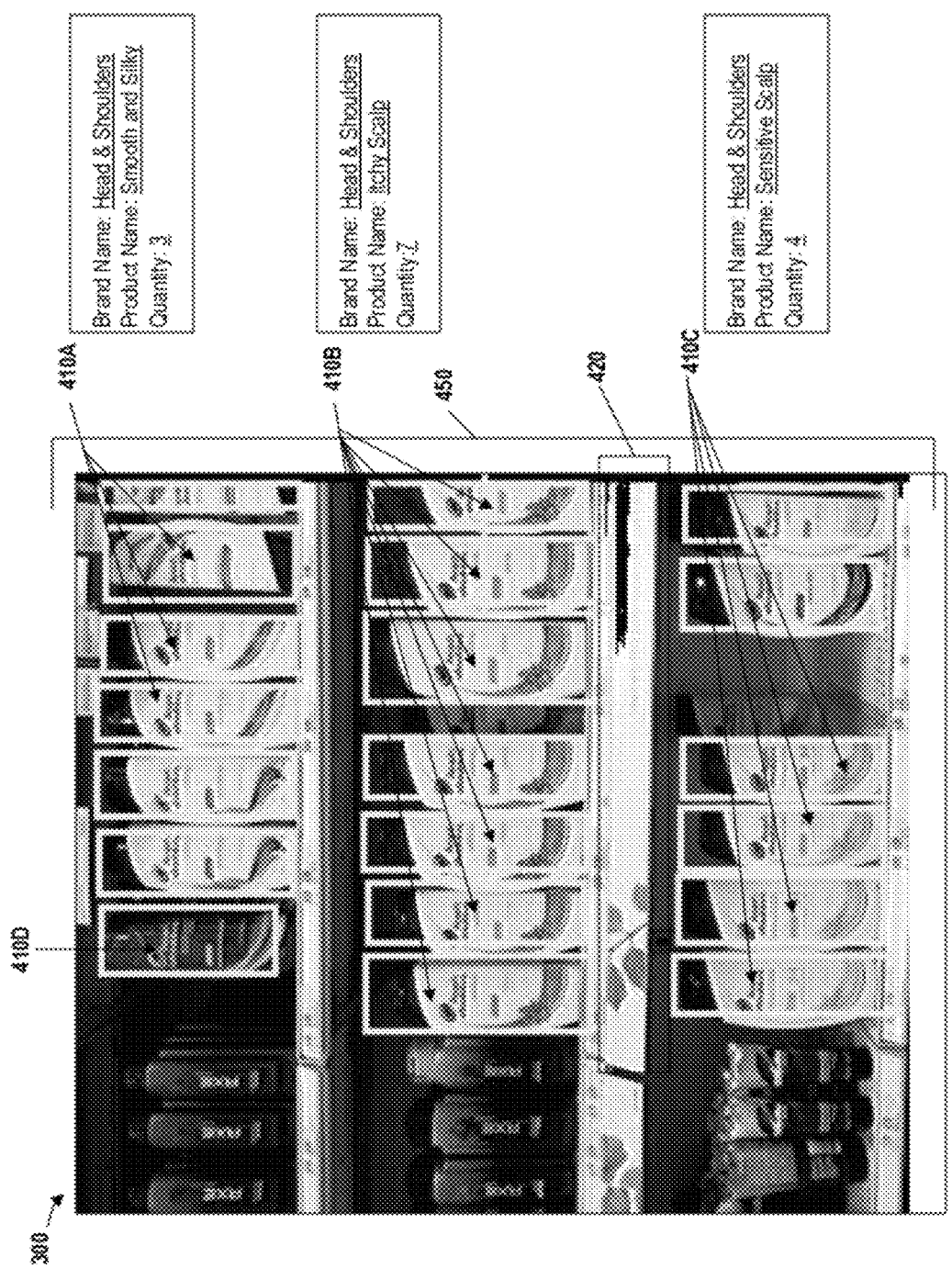
FIG. 4 depicts representations of several of the referenced identifications and/or determinations in accordance with at least one embodiment disclosed herein.

By way of illustration, FIG. 4 depicts, with respect to image 300, representations of several of the referenced identifications and/or determinations. For example, based on the processing of the image (using recognition techniques such as those known to those of ordinary skill in the art and/or described herein), various products 410A-D can be identified in the image. It should be noted that multiple instances of each product can appear in an image, such as the four instances of product 410C that appear in the image. Additionally, it can be appreciated that, for each product, a brand name and/or product name can be identified. For example, while products 410A-C all correspond to the brand 'Head & Shoulders,' product 410A corresponds to the 'Smooth & Silky' product, while product 410C corresponds to the 'Sensitive Scalp' product. The number of instances of each product can also be tracked. Thus, it can be appreciated that while there are only three items corresponding to product 410A in image 300, there are seven instances of product 410B.

By way of further illustration, the relative locations of each respective product can be determined. For example, with reference to FIG. 4, the presence of products 410A on the top shelf, the presence of products 410B on the middle shelf (immediately below products 410A), and products 410C on the bottommost shelf shown in the image (together with the respective quantities of each respective product and other such factors and aspects, such as those referenced herein) can be determined, reflecting the retail arrangement of each respective product and/or a group/line of products. For example, it can be said that the retail arrangement of product 410B includes the quantity of items (seven), together with its relative proximity to other items (e.g., immediately below product 410A and immediately above product 410C). By way of further example, in certain implementations a retail arrangement of a product can be characterized by its proximity to a competing product, such as the proximity of product 410A to competing product 410D, as shown in FIG. 4. By way of yet further example, an arrangement of a group of products (e.g., all 'Head & Shoulders' products) can also be determined. Thus, with reference to FIG. 4, an arrangement of all 'Head & Shoulders' products on the shelf can reflect the total number of products visible, the number of products on each shelf (e.g., five items on the top shelf, etc.), and/or their respective proximities to other items.

As referenced above, supplemental materials 420 can also be identified and considered as part of the determination of a retail arrangement. For example, FIG. 4 shows one such supplemental material, an advertising banner 420 (though it should be understood that many other such materials are also possible, e.g., coupon dispensers, promotional displays, in-store demonstrations, etc.). Thus, by way of illustration, the arrangement of the various products 410 can be characterized by the presence of advertising banner 420 below product 410B and above product 410C.

At 230, processor 110 executing one or more of software modules 130, including, in certain implementations, determination application 170, configures computing device 105 to determine an authenticity of one or more products, such as those identified at 220. That is, it can be appreciated that, in certain settings, some retailers may attempt to sell counterfeit (or otherwise inauthentic) products in lieu of (or as an alternative to) genuine, authentic products (such as products manufactured under a well-known brand name or label). Accordingly, it can be further appreciated that while certain aspects or features of such counterfeit products are comparable to those of their genuine counterparts (e.g., having the same brand/product name, being of the same color, etc.), other aspects or features can be altered, even slightly, in the counterfeit products. For example, the fonts used in the packaging of the counterfeit product can be slightly different from those used in the original, and/or the packaging used for the counterfeit product may be of an inferior quality (e.g., its printing and/or construction may be of lower quality than that of the authentic product). As such, in certain implementations, such as those in which a product having a propensity for being counterfeited is identified, the one or more images can be analyzed to determine the authenticity (or lack thereof) of the product or products appearing in the image(s). Previously determined instances of counterfeit products can also be considered in selecting products for the referenced authenticity determination.

At 240, processor 110 executing one or more of software modules 130, including, in certain implementations, determination application 170, configures computing device 105 to determine the integrity (e.g., a measure or degree of integrity) of the various images. That is, it can be appreciated that images originating from certain sources may be susceptible to modification or tampering. For example, a merchant that is required to regularly submit images of various product displays (and whose performance/compliance with various guidelines is tracked) may be inclined/tempted to modify/tamper with various aspects of an image, such as by tampering with the time/date stamp of an image, and/or by attempting to tamper with the image itself. Accordingly, the integrity of various aspects of the received images can be analyzed to determine the integrity of the images (e.g., with respect to the content of the image itself and/or the metadata). For example, various image processing methods/algorithms can be employed that can determine whether an image has been modified or not, as is known to those of ordinary skill the art. By way of further example, all modifications to the image file (including the metadata) are tracked, thereby ensuring that any attempted tampering will be discoverable.

At 250, processor 110 executing one or more of software modules 130, including, in certain implementations, determination application 170, configures computing device 105 to compute various performance indicators 185. Such performance indicators can reflect compliance (such as on the part of the retailer) with one or more retail arrangements guidelines or requirements, such as those dictated by a product manufacturer/distributor. That is, it can be appreciated that various product manufacturers/distributors can enter into agreements with retailers whereby the retailer agrees to present certain products in certain ways at certain times. For example, a manufacturer can enter into an agreement whereby a desirable shelf location is designated for a particular product, such as during a promotional period. Accordingly, in order to monitor the degree to which the retailer is abiding by such an agreement, the referenced performance indicators can be computed, such as based on the identification of one (or more) products in an image and/or the determination of a retail arrangement of one (or more) products in an image (such as those identified/determined at 220). For example, with reference to FIG. 4, one retail arrangement guideline can require that, where 'Head & Shoulders' shampoos are displayed, advertising banner 420 be placed along the top shelf. Accordingly, a corresponding performance indicator can reflect compliance (or lack thereof) with such a guideline with respect to such products. With regard to FIG. 4, it can be appreciated that the arrangement 450 shown (having advertising banner 420 placed along the middle shelf) does not reflect compliance with such a guideline.

By way of further illustration, one such performance indicator can reflect a portion of a retail display that is occupied by a specific product or products. In such a scenario, in computing one or more performance indicators comprises determining, based on the identification of one (or more) products and/or the determination of a retail arrangement of one (or more) products, the portion of a retail display occupied by the specific product. For example, it can be appreciated with reference to FIG. 4 that 'Head & Shoulders' branded products cover approximately 90% of the shelf space shown in the image (spanning three shelves).

By way of further illustration, another example performance indicator can reflect a portion of a retail display occupied by one product in relation to another product (or products). That is, it can be appreciated that a retailer can agree to maintain stock of one product in relation to the stock of another product or products (e.g., generic products, competing products, etc.). In such a scenario computing one or more performance indicators comprises determining, based on the identification of one (or more) products and/or the determination of a retail arrangement of one (or more) products, such as those identified/determined at 220, the portion of a retail display occupied by the at least one product in relation to the one or more other products.

By way of yet further illustration, another example performance indicator can be an indicator that reflects a stock ratio of a product. In such a scenario computing one or more performance indicators can include determining, based on the identification of one (or more) products and/or the determination of a retail arrangement of one (or more) products, the stock ratio of the at least one product. For example, the stock ratio can include a ratio of areas of a retail display occupied by the at least one product to unoccupied areas of the retail display. It should be understood that, in such an implementation, the retail display can include a retail display designated for the at least one product.

Additionally, in certain implementations, computing one or more performance indicators further includes computing the one or more performance indicators based on the authenticity of the at least one product.

In addition, in certain implementations, computing one or more performance indicators further includes computing the one or more performance indicators based on the integrity of the one or more images.

Moreover, in certain implementations the one or more retail arrangement guidelines comprises a planogram 183 (or any other such visual or schematic diagram or depiction of a retail arrangement or display), as are known to those of ordinary skill in the art. It should be further understood that in such implementations the one or more performance indicators can reflect compliance with the planogram based on (a) the identification of the at least one product and (b) the determination of a retail arrangement of the at least one product, such as in the manner described herein.

At 260, processor 110 executing one or more of software modules 130, including, in certain implementations, determination application 170, configures computing device 105 to provide feedback based on the one or more performance indicators. For example, it can be appreciated that various reports and/or alerts can be generated and/or transmitted based on various of the performance indicators. By way of illustration, a product manufacturer/distributor can be provided with a report that reflects how various retailers performed with respect to specific performance indicators (e.g., percentage of time that shelves of specific products were fully stocked, percentage of time that products were presented in arrangement dictated by manufacturer, etc.). It can be appreciated that, in doing so, product manufacturers/distributors can identify which retailers are (or are not) regularly complying with agreed upon product arrangements, as reflected by the referenced performance indicators.

At 270, processor 110 executing one or more of software modules 130, including, in certain implementations, determination application 170, configures computing device 105 to generate one or more promotions in response to receipt of the one or more images. By way of illustration, in one scenario a promotion can be generated for and/or provided to a customer in return for the successful submission of an image reflecting an arrangement of a particular product or products. It can be appreciated that such a promotion (e.g., an instant coupon or discount) can be provided to the customer by the product manufacturer/distributor as an incentive to encourage the customer to submit such images (and thus enable the manufacturer/distributor to track product arrangements of the desired product).

By way of further example, in certain implementations, future promotions and/or pricing suggestions can be generated and/or provided based on various performance indicators, such as those computed at 250. For example, it can be appreciated that a retailer that has been determined to be relatively more compliant with various retail arrangements guidelines dictated by a manufacturer/distributor is likely, from the standpoint of the manufacturer/distributor, more deserving of promotional pricing considerations (e.g., discounts) than a that a retailer determined to be relatively less compliant with such retail arrangements guidelines. Accordingly, such performance indicators can be considered (optionally together with other relevant data, such as sales figures) in suggesting future pricing models for various retailers.

It should also be noted that, in certain implementations, any and/or all of the identifications, determinations, etc., referenced herein can be stored in a performance log 186. It can be appreciated that such a log can provide historical performance data with respect to a particular product, retailer, etc. In doing so, various types of data analysis and comparison can be performed, enabling users (whether on behalf of the retailer, the manufacturer/distributor, and/or a third-party) to track how various products are arranged in a retail context. For example, a presently determined portion of a retail display that is occupied by a specific product or products can be compared with previously determined values in order to determine whether or not a shelf has (or has not been) re-stocked (a positive change in such a percentage can indicate that the shelf has been re-stocked during the interval between the capture of the respective images).

By way of further example, the referenced performance data can be correlated with sales data for the various products (such as those identified in various images as described herein) in order to determine the effect that a particular product arrangement has on the sales of a particular item. For example, such a correlation can demonstrate that while a particular product did not sell well when arranged on the bottom shelf of a retail display, upon moving the product to the top shelf, sales of the product improved dramatically (despite having the same price). By way of further example, relationships between sales/promotions and product arrangement can be identified. By way of illustration, if it can be observed that sales volumes are relatively consistent whether a product is sold at a sale price and arranged on the bottom shelf of a display, or at a regular (non-sale) price and arranged on the top shelf of a display, it can be concluded that such a sale can effectively counterbalance the 'negative' effects of having a product arranged on a bottom shelf. It can be appreciated that such an insight can assist both retailers and manufacturers/distributors in maximizing revenue from products arranged in such spaces.

Moreover, it can be appreciated that various aspects described herein can be implemented in an inventory management context. That is, the various identifications and determinations referenced herein can be further utilized to manage inventory within a particular store or stores. For example, having determined that a particular product is consistently under stocked (e.g., less that 70% of the available shelf space is populated with product), it can be determined that the retailer may not be maintaining enough stock of the product.

Moreover, it should be understood that various location and/or contextual information can be considered and utilized during any number of the processes referenced herein. For example, it can be appreciated that many retail locations (such as department stores) maintain detailed maps and/or diagrams which depict the areas of the store (e.g. particular aisles, or even areas within a particular aisle). It can be further appreciated that images, such as those captured by smartphones having GPS capabilities, can be geo-tagged with metadata that reflects a specific geographic location where the image was captured. Accordingly, upon receiving an image with such a geo-tag, the geographic coordinates associated with the picture can be correlated with the store map in order to narrow down the possible products that the image might contain. In doing so, the various identification and/or determination operations described herein can be focused/narrowed towards those products/those classes of products that are contained in the specified area of the retail location. It can be appreciated that such an approach can increase the processing efficiency of the methods and systems described herein, and can also lead to a more accurate identification/determination of a product (by limiting the potential matches to those items that are known to be present in the location where the image was captured).

Figure 5:
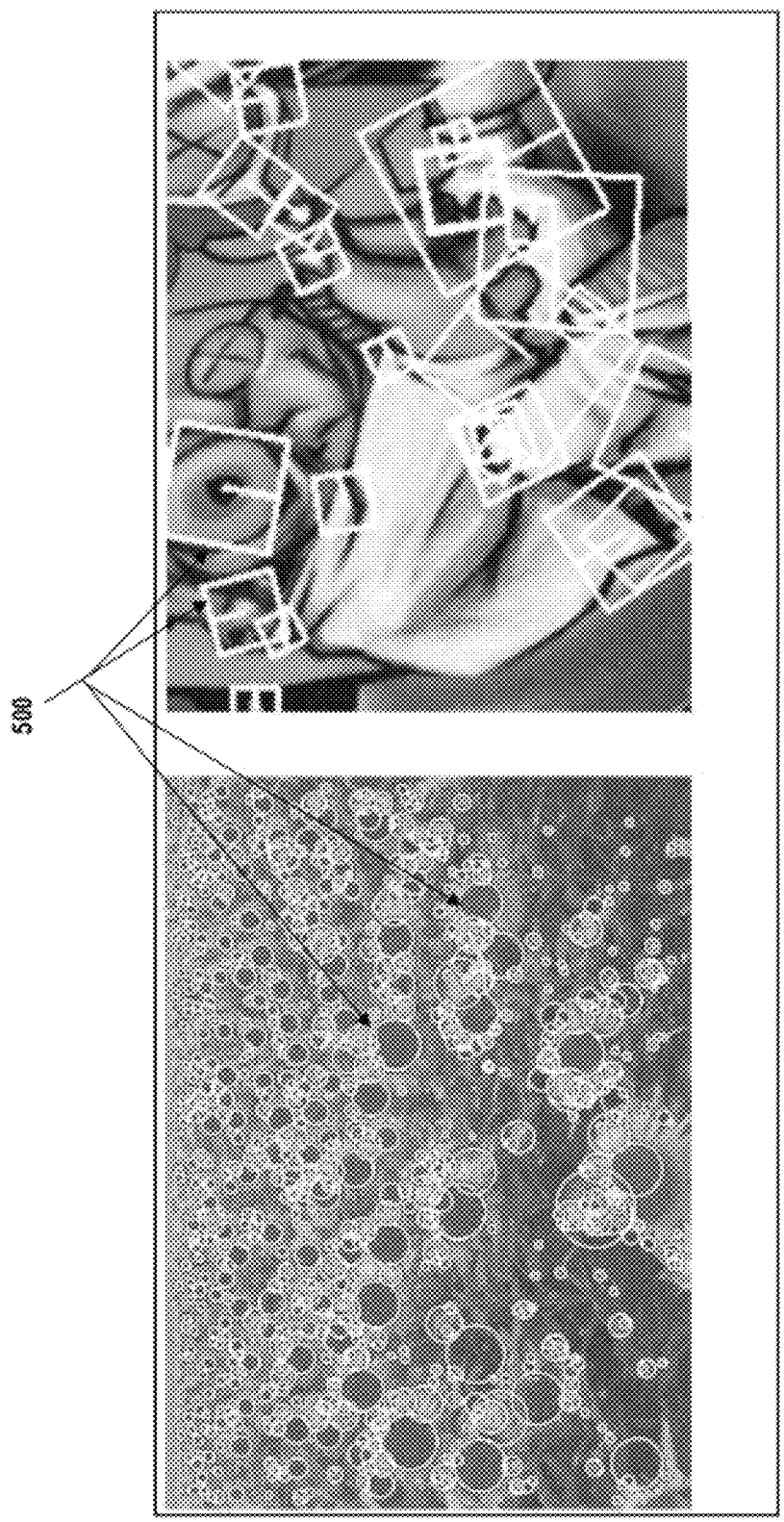
FIG. 5 depicts examples of images with interest points, in accordance with at least one embodiment disclosed herein.

It should also be noted that, in certain implementations, various of the operations referenced herein are operative to detect, identify, and/or classify objects (such as products) based on the object's signature. The signature can be extracted using interest points (IP), also known as keypoints or feature-points. In a typical object there are between a dozen to several hundred IPs, depending on the resolution and number of hot spots. Examples of images with such interest points 500 are shown in FIG. 5. The points normally are located in intensity peaks and corners.

The Interest Point (IP) algorithm has three main functions—detector (that finds the IPs in the object), descriptor (that describes the IP as a set of numbers), and a template match function (which compares the descriptor to templates of known object classes). The IP detector passes on the region of interest and produces many potential IPs. The potentially non stable or non distinctive IP is filtered out and a description of the remaining IPs is generated.

Interest points can be locations in the image that have one or more of the following characteristics:

Their position is well defined and stable. Stable means that when changing the capture conditions, like lighting, viewing angle and distance (size) by certain limited amount, the algorithm still detects the point as interest point.

The description of the interest point is distinctive. This means that the description of one IP is substantially different from the description of the other IPs.

Methods of IP detectors and descriptors are known to those of ordinary skill in the art. Examples include:

Harris corner detector (Harris, C., Stephens, M.: A combined corner and edge detector; Proceedings of the Alvey Vision Conference. (1988) 147-151), Modified Harris methods (such as: Mikolajczyk, K., Schmid, C.: Indexing based on scale invariant interest points. In: ICCV. Volume 1. (2001) 525-531), SIFT (Lowe, D.: Object recognition from local scale-invariant features. In: ICCV. (1999)), and SURF (Bay H., Tuytelaars T., and Van Gool L.: SURF: Speeded Up Robust Features. ECCV 2006), each of which is incorporated by referenced herein in their respective entireties.

One implementation of the present system and method uses the SURF detector and descriptor, although other methods can be similarly used for implementing the detection and descriptor. The SURF descriptor for each IP is preferably a vector of 64 (or 128) numbers, which are computed from 4 summation responses within 4×4 squares in the neighborhood of the IP.

Building the Template Database

As described herein, certain implementations of the present system and method involve matching a given captured object image (of product on the shelf) to a set of previously stored templates of products.

In one implementation, during a training phase, several dozen images are captured or received from different sources (such as different stores). Then, each product is marked, its brand name is identified or entered, and its image inside the region is cropped and stored as a template library. Several different images of the same product can be collected, such that the set of templates will have a variation of different orientations/exposures of the same product.

Each of the templates can be analyzed (such as in the manner described herein) and their Interest Points (IPs) are detected. For each IP, a numerical descriptor is calculated and stored in the template database. In doing so, the image templates can be converted to numeric vectors. A typical template for a product icon, using high resolution cameras, is 200×150 pixels, and contains about 150 IPs, where each IP, in accordance with SURF, is a vector of 64 (or 128) values. It should be understood that this example is not limiting and other embodiments may exist for obtaining the templates, including, for example, obtaining them from an external source, such as a central database.

Matching Interest Points

In a testing phase, the newly captured image of the product can be analyzed and its IPs are generated. Then, the numerical database of the templates can be scanned and one or more attempts can be made to match the image IPs to one or more templates IPs. If a significant match is found, the system can determine the classification. According to the quality of the match, a confidence measure is calculated. If a high quality match is found, the system can report the icon class and its confidence.

Interest points are normally extracted in grey level images, as they rely on the intensity gradient information. However, color can supplement the information on the observed object in order to increase the confidence of the classification to a certain class of objects.

In order to utilize the color information of the object, the present system and method uses color histograms to better match the object to one of the known classes. Color histograms are invariant to translation and rotation about the viewing axis, and change only slowly under change of angle of view, change in scale, and occlusion. Given that, in certain implementations, object colors are matched over a variety of illuminations and cameras, we methods which are better immune to illumination color changes can be selected. Furthermore, the color histograms can be calibrated and normalized in order to reduce the effects of the environment and the camera.

The color histogram of the classified object is matched to the color histogram of the detected object. This match results assists in the object classification.

It should be noted that various aspects and features referenced herein are also describe in International (PCT) Patent Application No. PCT/IL2011/000634, filed Aug. 4, 2011, entitled "METHOD AND SYSTEM FOR COLLECTING INFORMATION RELATING TO IDENTITY PARAMETERS OF A VEHICLE," which is hereby incorporated by reference herein in its entirety.

In certain implementations, the operation of the present system and method is based on the classification of the objects present on a shelf (or shelves). The present system and method can maintain a number of templates for each product, such as the 'Head & Shoulders' brand shampoo, as referenced herein. As described herein, templates of each product can be scanned, and attempts can be made to match it to the shelf image using the interest-point and/or the color histogram matching technology. The matched objects can then be selected for the best match.

If there is a match with sufficient confidence, that object will be marked on the image and its area will be masked out. The system will continue this process on all the templates of the company's products, thus detecting all the objects matching to the templates. Each detected object can be marked and removed from the image.

From this detection the present system and method can calculate, among other things, the percentage of space share and the out-of-stock ratio within the s group area of a particular brand or company.

In certain implementations the IP matching process can work effectively with larger objects, since there are more interest points in a larger object. Moreover, in certain implementations, the normal objects used for classification, based on interest points, can be 70 by 70 pixels. In certain implementations the product test images sizes are larger—which can be preferable for this technique, such as an average object size of 250×130.

Among the advantages of the IP-matching solution of the present system and method is that the classification is less affected by the changes in the position of the object (tilt, view angle), the environment (illumination), and the scale of the object (small or large). This solution successfully operates in a wide and dynamic range of different parameters.

In certain implementations, if an object is not properly identified, a new template can be prepared from the exception image and the next batch of images can handle that type of exception. In doing so, templates corresponding to new products (i.e., products that have not previously been identified) can be stored and subsequently utilized to identify future instances of the particular product.

With regard to the quality of the image capture (which depends on the quality of the camera and/or the individual/system who takes the images), the quality of the focus and brightness/contrast can be determined and feedback regarding images that need retaking can be provided.

In certain implementations, the present system and method can operate without performing Optical Character Recognition (OCR). The technique of the present system and method requires an order of magnitude lower amount of details. The benefits of this is lower resolution requirement is that the shelf images can include a large field of view, thus making it easier for the store owner to cover all the shelves with less photos.

It should be understood that templates can be prepared, in certain arrangements, through a manual operation (marking the area of the object), and an automated process which converts the segments to templates, and/or a combination thereof.

A template can be a small image, preferably the size of the object, which is used for the matching process. There are preferably about a dozen templates for each product, each template being taken from a different camera and/or viewpoint. The templates are extracted from the images received from the field as described herein.

In certain implementations, template generation can be semi-automated using a proprietary template feeder program. In the template-feeder program the user of the program marks a rectangle around the template, defines the proper class name (in this case—the product) and the program extracts the template. For each stored template the program preferably enhances the quality of the image, and calculates the Interest points and color histograms. This information is stored it into a templates database (called "features.bin").

The program verifies that the image quality and resolution is sufficient, and if not will alert the user during the loading of the pictures. The pictures' resolution should preferably be at least 5 Megapixels.

In certain implementations, the user can specify the country (e.g., "USA"), the store code (e.g. "MCY"), email address, and other relevant information. These fields can appear later in a report, be inserted into the image header, and also can preferably be added on the bottom of each image in order to provide a simple, clear visual identification. Such information can also be added as metadata, in a manner known to those of ordinary skill in the art.

Each image can be subjected to a preprocessing phase, in order to increase the quality of the picture. During this step the quality of the picture can be assessed and the process can flag each faulty image and alert the user accordingly.

According to the entered Country and the store code, a subset of the pre-stored templates can be retrieved.

The program will also analyze the image and determine the shelves location and size using image processing algorithms (such as a modified Hough transform algorithm or equivalent, as is known to those of ordinary skill in the art). It can be appreciated that segmentation can, in certain implementations, be important for the performance indicator calculations described herein.

A template match operation can classify all objects in the picture. This can preferably be done within a sliding window across the shelves, with the region of interest (ROI) window set to the maximum template size with margins. This technique was found to be effective in lowering the error rate, and is best suited for shelf analysis.

For every location of the sliding window, the ROI image will preferably be subjected to the classifier.

Every region of interest (ROI) image can be classified with the set of templates, selected for the country/store.

The features will first be extracted from the ROI image, and then will be matched to each one of the templates. After completing the cycle, the best candidates are selected. According to the results, the product is selected according to the match confidence and the number of selections it received. A confidence will be attached to the classification result.

The results of the classification of each object can be the input to the next step—extracting the information.

A set of histograms of each classified object within the ROI can also be extracted. In certain implementations there can be several (3-5) histograms on each vertical segment of the object. The set of histograms can be matched to the pre-stored histograms of the SKU. The result of the histogram matching can add to the confidence of the classified object.

Upon analyzing the products/objects on one or more shelves, a post processing phase can analyze the classification results, and determine the group areas into 3 areas: "Company", "Other" and "Whitespace".

Moreover, based on the classifier results, a mapping of each product/objects to a respective location can be determined. Various classifications of the SKU, its confidence, and the global information of the group area can be determined, exceptions can be handled and false positive cases can be resolved. An output can be provided, such as: {Object 1: product $SKU_1$, $x_1$, $y_1$, $width_1$, $height_1$, $confidence_1$)}, {Object 2: product $SKU_2$, $x_2$, $y_2$, $width_2$, $height_2$, $confidence_2$}, etc.

As referenced herein, the performance indicator calculator can determine one or more performance indicators, including:

% Shelf share—the space occupied by one or more products versus the available space. This calculation can account for the group areas where certain products are found in order to take into account objects with low confidence.

Out of stock identification—as can be reflected by "white space" within a specific group area or areas.

List of SKUs identified—a summary of each SKU and how many were detected on the front side of the shelf.

Special points of sales (POS) material found—such items can also be added as templates, and can be counted just like the SKU. Their presence can be indicated in the report.

As referenced herein, a formatted report can be generated based on the results. It can preferably include the following sections:

1. Header—containing the user/store information
2. Results table—a row for each image, containing the following columns—
   Picture name, as tagged, with Hyperlink on each image.
   Number of SKUs found, with Hyperlink to a detailed list.
   % Shelf share
   % Out of stock
   Special POS
3. Summary
   % Shelf share
   % Out of stock
   Other performance indicators
4. Exceptions
5. Appendix—Detailed SKU list The images and the report can be saved in a daily directory. Directories can be arranged in a hierarchy of Country/Store/Date.

A summary of the results can be generated, such as a report will summarizing the results, with one line per store batch.

Each row in the table can preferably contain the following summary information—Country, Store, Date, # Images, % shelf share, % out-of-stock, # POS specials, exceptions A hyperlink will allow browsing to the specific store result in a web-interface.

Planograms—An optional feature can compare in-store actual image of shelf vs. planogram.

Live feed—The service can have an additional input for images which will be entered via live feed such as a H.264 video stream. The video interface will be through a video server as provided by many VMS companies.

Competitor brand recognition—providing an identification and analysis of competitor products.

At this juncture, it should be noted that although much of the foregoing description has been directed to systems and methods for determining product arrangement, the systems and methods disclosed herein can be similarly deployed and/or implemented in scenarios, situations, and settings far beyond the illustrated scenarios. It can be readily appreciated that product arrangement determination system 100 can be effectively employed in practically any scenario where the identification of items and/or their arrangement can be useful. It should be further understood that any such implementation and/or deployment is within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for determining product arrangements. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method comprising:
    capturing, by a device comprising a GPS, an image of a first product, the image comprising metadata corresponding to a geographic location at which the image was captured by the device as determined by the GPS;
    correlating the geographic location at which the image was captured with a map in order to identify one or more products that are potentially included in the image;
    processing one or more templates associated with the first product to (a) detect one or more interest points within the one or more templates and (b) compute a numerical descriptor for at least one of the one or more interest points within the one or more templates;
    converting the one or more templates into one or more numeric vectors;
    processing the image to generate one or more interest points of the image;
    matching, based on the one or more numeric vectors, the one or more interest points of the image with the at least one of the one or more interest points within the one or more templates;
    processing, by a processor, the image to identify, based on the one or more products identified as being potentially included in the image and based on a match of the one or more interest points of the image with the one or more interest points within the one or more templates, the first product;
    determining an integrity of the image, wherein determining an integrity of the image comprises determining whether the image has been tampered with;
    identifying the first product as a product having a propensity for being counterfeited;
    based on an identification of the first product as a product having a propensity for being counterfeited, analyzing the image to determine, based on one or more aspects of the first product that are different from one or more corresponding aspects of a genuine product, an authenticity of the first product;
    computing, based on (a) an identification of the first product, (b) the integrity of the image, and (c) the authenticity of the first product, one or more performance indicators, the one or more performance indicators reflecting compliance with an arrangement of the first product; and
    providing feedback based on the one or more performance indicators.

2. The method of claim 1, wherein computing one or more performance indicators comprises determining a portion of a retail display occupied by the first product.

3. The method of claim 1, wherein computing one or more performance indicators comprises determining a portion of a retail display occupied by the first product in relation to the one or more other products.

4. The method of claim 1, wherein computing one or more performance indicators comprises determining a stock ratio of the first product.

5. The method of claim 4, wherein the stock ratio comprises a ratio of areas of a retail display occupied by the first product to unoccupied areas of the retail display.

6. The method of claim 5, wherein the retail display comprises a retail display designated for the first product.

7. The method of claim 1, wherein the compliance with an arrangement comprises compliance with a planogram.

8. The method of claim 1, wherein processing the image comprises processing the image using optical recognition to identify the first product.

9. The method of claim 1, wherein the identification of the first product comprises an identification of at least one of:
    (a) a brand name of the first product,
    (b) a product name of the first product,
    (c) one or more stock keeping units (SKUs) of the first product, or
    (d) one or more supplemental materials.

10. The method of claim 1, further comprising generating one or more promotions in response to receipt of the image.

11. The method of claim 1, further comprising processing the image to determine a relative proximity of the first product to a second product.

12. The method of claim 1, wherein identifying the first product as a product having a propensity for being counterfeited comprises identifying the first product as a product having a propensity for being counterfeited based on a previously determined instance of a counterfeit product.

13. A system comprising:
    a processing device; and
    a memory coupled to the processing device and storing instructions that, when executed by the processing device, cause the system to perform operations comprising:
        receiving an image of a first product, the image comprising metadata corresponding to a geographic location at which the image was captured;
        correlating the geographic location at which the image was captured with a map in order to identify one or more products that are potentially included in the image;
        processing one or more templates associated with the first product to (a) detect one or more interest points within the one or more templates and (b) compute a numerical descriptor for at least one of the one or more interest points within the one or more templates;
        converting the one or more templates into one or more numeric vectors;
        processing the image to generate one or more interest points of the image;
        matching, based on the one or more numeric vectors, the one or more interest points of the image with the at least one of the one or more interest points within the one or more templates;
        processing the image to identify, based on the one or more products identified as being potentially included in the image and based on a match of the one or more interest points of the image with the at least one of the one or more interest points within the one or more templates, the first product;
        determining an integrity of the image, wherein determining an integrity of the image comprises determining whether the image has been tampered with;
        identifying the first product as a product having a propensity for being counterfeited;

based on an identification of the first product as a product having a propensity for being counterfeited, analyzing the image to determine, based on one or more aspects of the first product that are different from one or more corresponding aspects of a genuine product, an authenticity of the first product;

computing, based on (a) an identification of the first product, (b) the integrity of the image, and (c) the authenticity of the first product, one or more performance indicators, the one or more performance indicators reflecting compliance with an arrangement of the first product; and providing feedback based on the one or more performance indicators.

14. The system of claim 13, wherein computing one or more performance indicators comprises determining a portion of a retail display occupied by the first product.

15. The system of claim 13, wherein computing one or more performance indicators comprises determining a portion of a retail display occupied by the first product in relation to one or more other products.

16. The system of claim 13, wherein computing one or more performance indicators comprises determining a stock ratio of the first product.

17. The system of claim 16, wherein the stock ratio comprises a ratio of areas of a retail display occupied by the first product to unoccupied areas of the retail display.

18. The system of claim 17, wherein the retail display comprises a retail display designated for the first product.

19. The system of claim 13, wherein compliance with an arrangement comprises compliance with comprises a planogram.

20. The system of claim 13, wherein processing the image comprises processing the image using optical recognition to identify the first product.

21. The system of claim 13, wherein the identification of the first product comprises an identification of at least one of:
 (a) a brand name of the first product,
 (b) a product name of the first product,
 (c) one or more stock keeping units (SKUs) of the first product, or
 (d) one or more supplemental materials.

22. The system of claim 13, wherein the memory further stores instructions for causing the system to perform operations comprising generating one or more promotions in response to receipt of the image.

23. The system of claim 13, wherein the memory further stores instructions for causing the system to perform operations comprising processing the image to determine a relative proximity of the first product to a second product, and wherein computing one or more performance indicators comprises computing the one or more performance indicators further based on the relative proximity of the first product to the second product.

24. The system of claim 13, wherein identifying the first product as a product having a propensity for being counterfeited comprises identifying the first product as a product having a propensity for being counterfeited based on a previously determined instance of a counterfeit product.

25. A non-transitory computer readable medium having instructions stored thereon that, when executed by a data processing apparatus, cause the data processing apparatus to perform operations comprising:

receiving an image of a first product, the image comprising metadata corresponding to a geographic location at which the image was captured;

correlating the geographic location at which the image was captured with a map in order to identify one or more products that are potentially included in the image;

processing one or more templates associated with the first product to (a) detect one or more interest points within the one or more templates and (b) compute a numerical descriptor for at least one of the one or more interest points within the one or more templates;

converting the one or more templates into one or more numeric vectors;

processing the image to generate one or more interest points of the image;

matching, based on the one or more numeric vectors, the one or more interest points of the image with the at least one of the one or more interest points within the one or more templates;

processing the image to identify, based on the one or more products identified as being potentially included in the image and based on a match of the one or more interest points of the image with the at least one of the one or more interest points within the one or more templates, the first product;

determining an integrity of the image, wherein determining an integrity of the image comprises determining whether the image has been tampered with;

identifying the first product as a product having a propensity for being counterfeited;

based on an identification of the first product as a product having a propensity for being counterfeited, analyzing the image to determine, based on one or more aspects of the first product that are different from one or more corresponding aspects of a genuine product, an authenticity of the first product;

computing, based on (a) an identification of the first product, (b) the integrity of the image, and (c) the authenticity of the first product, one or more performance indicators, the one or more performance indicators reflecting compliance with an arrangement of the first product; and providing feedback based on the one or more performance indicators.

26. The method of claim 11, wherein computing one or more performance indicators comprises computing the one or more performance indicators further based on the relative proximity of the first product to the second product.

27. The computer-readable medium of claim 25, wherein the medium further stores instructions for causing the data processing apparatus to perform operations comprising processing the image to determine a relative proximity of the first product to a second product, and wherein computing one or more performance indicators comprises computing the one or more performance indicators further based on the relative proximity of the first product to the second product.

28. The computer-readable medium of claim 25, wherein identifying the first product as a product having a propensity for being counterfeited comprises identifying the first product as a product having a propensity for being counterfeited based on a previously determined instance of a counterfeit product.

* * * * *